United States Patent
Maldera et al.

(10) Patent No.: US 6,497,514 B2
(45) Date of Patent: Dec. 24, 2002

(54) SEALING DEVICE FOR A FLANGED BEARING

(75) Inventors: Carlo Maldera, Giaveno (IT); Angelo Vignotto, Turin (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/864,359

(22) Filed: May 23, 2001

(65) Prior Publication Data

US 2002/0001422 A1 Jan. 3, 2002

(30) Foreign Application Priority Data

Jun. 6, 2000 (IT) .......................................... TO00A0533

(51) Int. Cl.[7] ............................................. F16C 33/78
(52) U.S. Cl. ...................... 384/486; 384/477; 384/484; 277/353; 277/402
(58) Field of Search ................................. 384/477, 479, 384/480, 481, 484, 485, 486, 487; 277/353, 402

(56) References Cited

U.S. PATENT DOCUMENTS 5,042,822 A * 8/1991 Dreschmann et al. ....... 384/485
5,096,207 A * 3/1992 Seeh et al. .................. 384/486

FOREIGN PATENT DOCUMENTS

| EP | 0 458 123 | * | 5/1991 |
| EP | 0 807 775 | * | 5/1997 |
| EP | 0 902 203 | * | 9/1998 |

* cited by examiner

Primary Examiner—David A. Bucci
Assistant Examiner—William C Joyce
(74) Attorney, Agent, or Firm—Merchant & Gould P.C.

(57) ABSTRACT

Sealing device for a flanged bearing for a wheel hub in which the flanged ends (13) of the outer race (11) have the metallic rings (14) of a sealing device (15) pressed on to their internal surfaces; each metallic ring (14) incorporates a rubber element (16) which is suitable for forming a static seal on the outer race of the bearing; the rubber element (16) extends towards the inner race (10) of the bearing (12) to then bend back towards the outside of the bearing itself with an appendix (17), which forms two seals (18 and 19) on the internal surface of a second metallic ring (20); the latter is pressed on to the external surface of the inner race (10) of the bearing; a rubber element (21) is applied to the ring (20) in correspondence with its free end (22) which is axially turned towards the inside of the device; the rubber element (22) presents at least two lips (24 and 25), one of which creates a dynamic seal between the two races (10 and 11) of the bearing together with the above-mentioned lips (24 and 25) of the metallic ring (14), while the second lip (25) creates a static seal of the ring (20) against the surface (23) of the inner race (10) of the bearing which it faces.

2 Claims, 2 Drawing Sheets

SEALING DEVICE FOR A FLANGED BEARING

TECHNICAL FIELD

The present invention refers to a sealing device for a flanged bearing.

BACKGROUND

The present invention may be advantageously, but not exclusively, applied in the field of flanged bearings for the hub-bearing groups of vehicle wheels, to which the description which follows will make explicit reference without, however, losing any of its general nature.

Older types of hub-bearing groups present a sealing device made up of a metallic insert, which is anchored to the flanged end of the outer race of the bearing and is provided with a vulcanised rubber body, which extends from the free end of the insert itself.

The rubber body comprises a number of lips (usually from two to five) which extend to form seals on the surface on the inner race of the bearing and on the flanged surface of the hub which faces the above-mentioned lips.

Although sealing devices of the above-mentioned type have performed their function adequately for a number of years, they present some inconveniences, such as difficulties relating to assembly due to the relevant quantity of lips and the brief working life of the lips themselves.

A more recent version of this kind of sealing device still presents a metallic ring which is anchored to the flanged end of the outer race of the bearing and which is provided with a vulcanised rubber body which extends from the insert itself, but in this case the lips of the rubber body create a dynamic seal on the internal surface of a second metallic ring which is anchored to the inner race of the bearing.

This alternative permits a better, safer assembly of the various components and results in a better and more reliable dynamic seal between the two metallic rings, but there is no seal on the flanged section of the inner race of the bearing; as a result, various external agents such as mud, water and dust can easily enter via the free space between the sealing device and the hub flange, a factor which causes problems of alignment and centering between the bearing and the hub flange.

SUMMARY

The aim of the present invention is to produce a sealing device for flanged bearings which reduces the difficulties regarding assembly and which permits an improvement in the working life of the bearings themselves, thus increasing their reliability.

Another aim of the present invention is to produce a sealing device which further improves the sealing characteristics on the hub-bearing group.

In order to fulfil these aims, and other aims which will be better explained in the following description, the present invention proposes the realisation of a sealing device for a flanged bearing in particular for a wheel hub in which the flanged ends of the outer race of the bearing have shrunk on to their internal surface the metallic rings of a sealing device; each metallic ring incorporates a rubber element which is suitable for forming a static seal on the outer race of the bearing; the rubber element extends towards the inner race of the bearing to then bend back towards the outside of the bearing itself with an appendix, which forms two seals on the internal surface of a second metallic ring; the latter is shrunk on to the external surface of the inner race of the bearing; the device is characterised by the fact that a rubber element is applied to the ring in correspondence to its free end, which is axially turned towards the inside of the device; the rubber element presents at least two lips, one of which forms a dynamic seal between the two races of the bearing together with the above-mentioned lips of the metallic ring, while the second lip forms a static seal of the ring against the surface of the inner race of the bearing which it faces.

DESCRIPTION OF THE DRAWINGS

A sealing device according to the present invention will now be described with reference to the attached drawings, in which.

DETAILED DESCRIPTION

Figure 1:
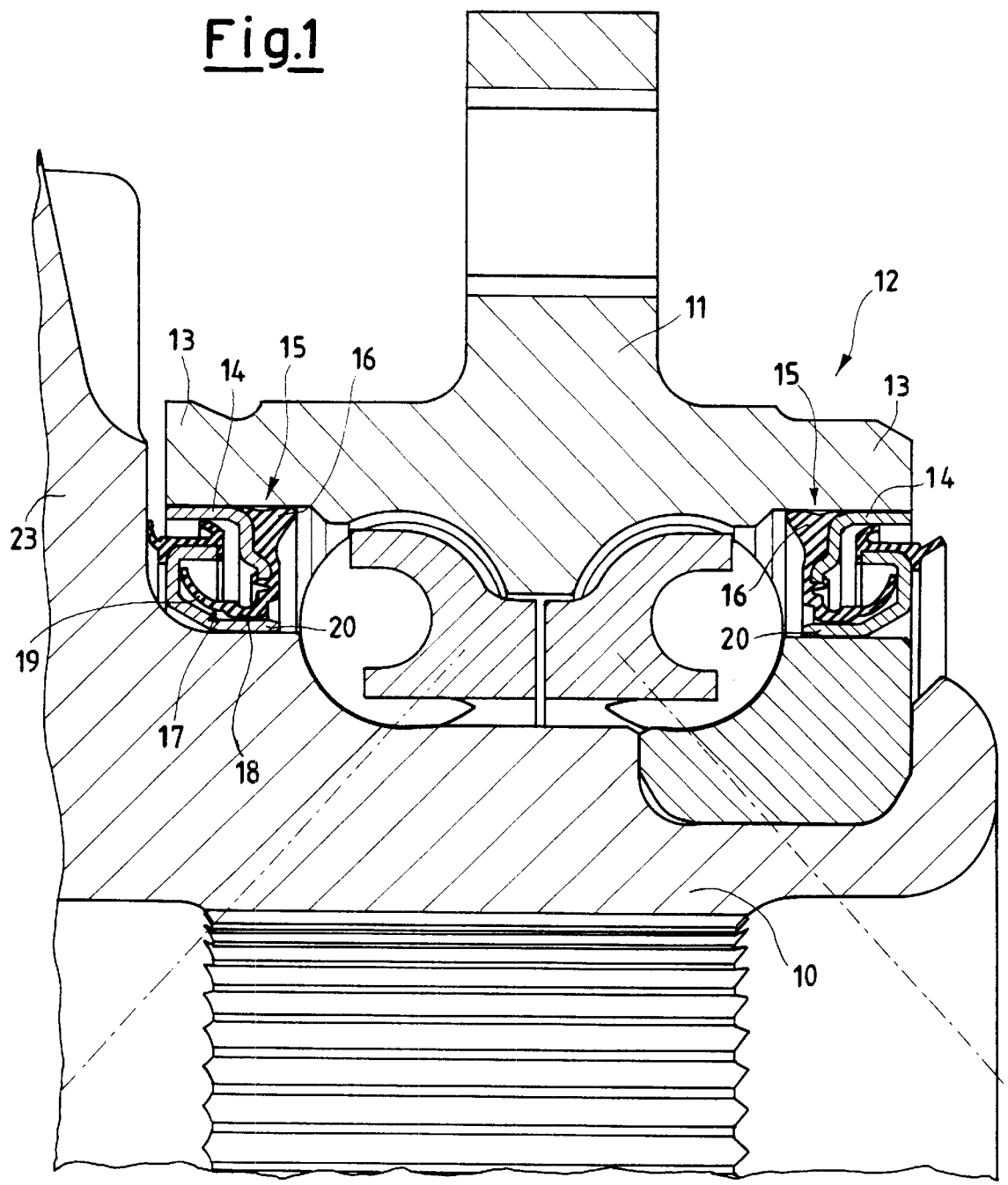
FIG. 1 is an axial section view of hub-bearing group which is provided with a sealing device according to the present invention.

The preferred, but non-limiting, embodiment of the present invention is that of a wheel hub in which the number 10 defines the inner race and the number 11 defines the outer race of the bearing 12.

The metallic rings 14 of the sealing device 15 are shrunk or pressed on to the flanged end 13 of the outer race 11.

As the sealing devices which are positioned at the two ends of the bearing are identical, the following description will refer to only one of them for reasons of simplicity and ease of explanation.

The metallic ring 14 incorporates a rubber element 16 which has the function of forming a static seal for the sealing device 15, in its entirety, on the outer race 11 of the bearing in that it adheres against the upper part of the internal surface.

As is illustrated in the drawings, the rubber element 16 extends towards the inner race 10 of the bearing 12 to then bend back towards the outside of the bearing itself with an appendix 17, which forms two seals 18 and 19 on the inner surface of a second metallic ring 20, which is shrunk or pressed on to the external surface of the inner race 10 of the bearing. The ring 20 is configured in such a way as to substantially follow the flanged outline 23 of the inner race 10.

According to the present invention a rubber element 21 is applied to the ring 20 in correspondence to its end 22 which is axially turned towards the inside of the device.

Figure 2:
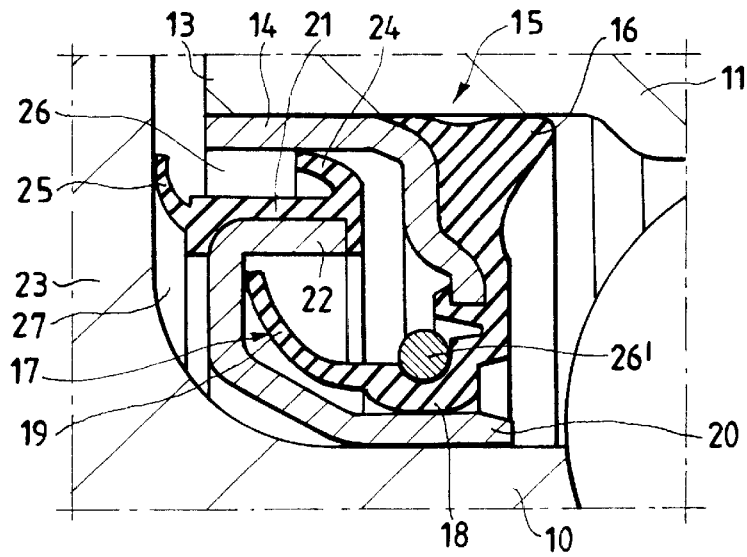
FIG. 2 is an enlargement of the sealing device illustrated in FIG. 1, shown under working conditions.
Figure 3:
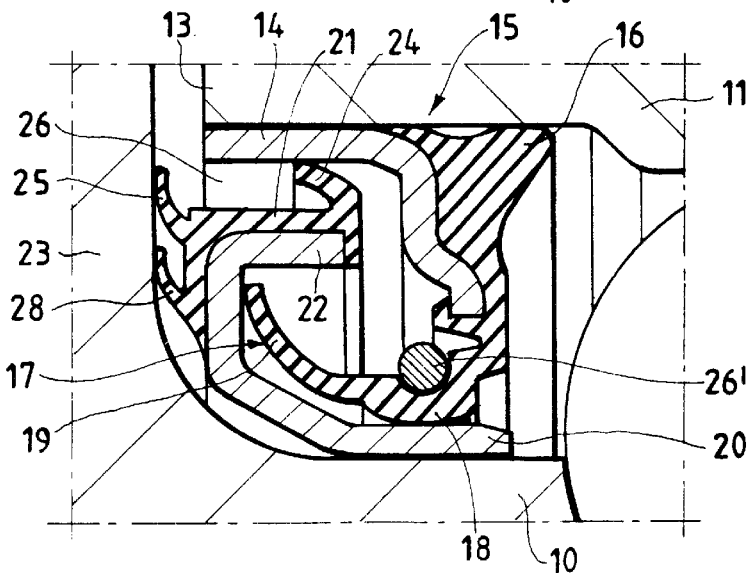
FIGS. 3 and 4 are variations of the sealing device illustrated in the above-mentioned drawings.
Figure 4:
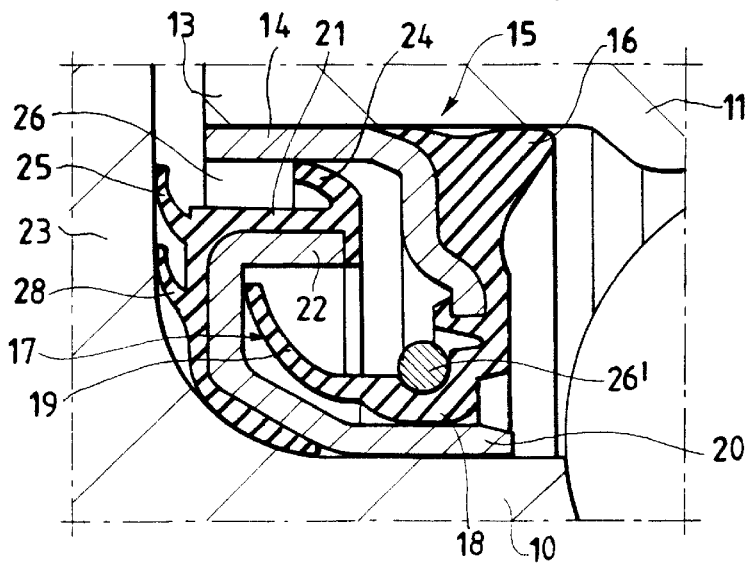

According to a first form of embodiment (as shown in FIGS. 1 and 2) the rubber element presents two lips 24 and 25; the lib 24 creates a dynamic seal between the two races 10 and 11 of the bearing together with the lips 18 and 19 of the metallic ring 14. As can be seen in FIGS. 2, 3, and 4 the lip 18 can be provided with a stiffening spring 26.

The second lip 25 of the rubber element 21, on the other hand, creates a static seal of the ring 20 on the flanged section 23 of the inner race of the bearing. Furthermore, the lip 25 realises a channel 26 which expels any contaminating agents via a centrifugal effect.

The lip 25 is positioned as near as possible to the mouth of the channel 26 in such a way as to prevent any foreign matter (such as sand, mud, dust or water) from entering inside the chamber 27, such matter could create pressure which could compromise the axial position of the inner race 10 of the bearing.

FIG. 3 illustrates a variation of the drawing shown in FIG. 2, in which, apart from the lip 25, there is a second lip 28 inside it—which has the aim of improving the static seal in the case that any foreign matter succeeds in overcoming the barrier constituted by the first lip 25.

Finally, FIG. 4 shows a variation in which, apart from the second lip 28, the rubber element which forms the two lips 25 and 28 extends along the external surface of the ring 20 in order to adhere for a long section against the external surface of the inner race 10 of the bearing, in such a way as to improve the above-mentioned static seal even further.

What is claimed is:

1. Sealing device for a flanged bearing in which flanged ends (13) of an outer race (11) of a bearing have, pressed on internal surfaces, first metallic rings (14) of a sealing device (15); each first metallic ring (14) incorporating a first rubber element (16) which is suitable for forming a static seal on the outer race (11) of the bearing; the first rubber element (16) extending towards an inner race (10) of the bearing (12) and then bending back towards an outside of the bearing with an appendix (17), which forms two seals (18 and 19) on an internal surface of a second metallic ring (20); the second metallic ring (20) pressed onto an external surface of the inner race (10) of the bearing; the device comprising a second rubber element (21) that is applied to the second metallic ring (20) in correspondence to a free end (22) of the second metallic ring (20) which is axially turned towards an inside of the device; the second rubber element (21) including at least first and second lips (24 and 25), the first lip forming a dynamic seal between the two races (10 and 11) of the bearing together with the two seals (18 and 19) of the first metallic ring (14), while the second lip (25) forms a static seal of the second metallic ring (20) against the external surface (23) of the inner race (10) of the bearing, the second lip (25) being positioned adjacent to a mouth of a channel (26) which is defined between the said external surface (23) of the inner race (10) of the bearing and surfaces of the first and second metallic rings (14 and 20) which face each other; wherein, in addition to the second lip (25), there is a third lip (28) inside the second lip (25).

2. Sealing device according to claim 1, characterised by the fact that, in addition to forming the first and second lips (25 and 28), the second rubber element extends along the surface of the second metallic ring (20) in such a way as to adhere against the external surface of the inner race (10) of the bearing.

\* \* \* \* \*